UNITED STATES PATENT OFFICE.

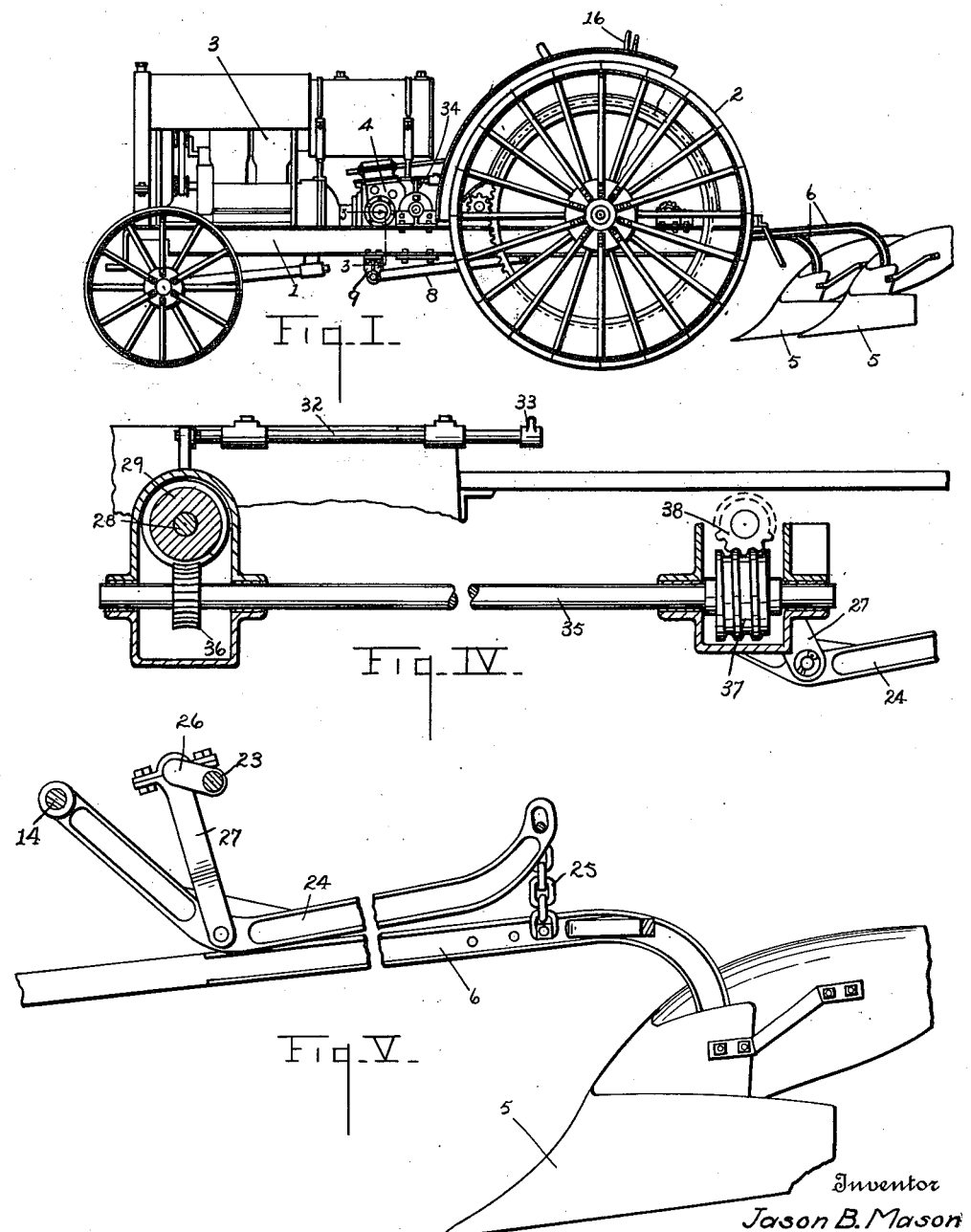

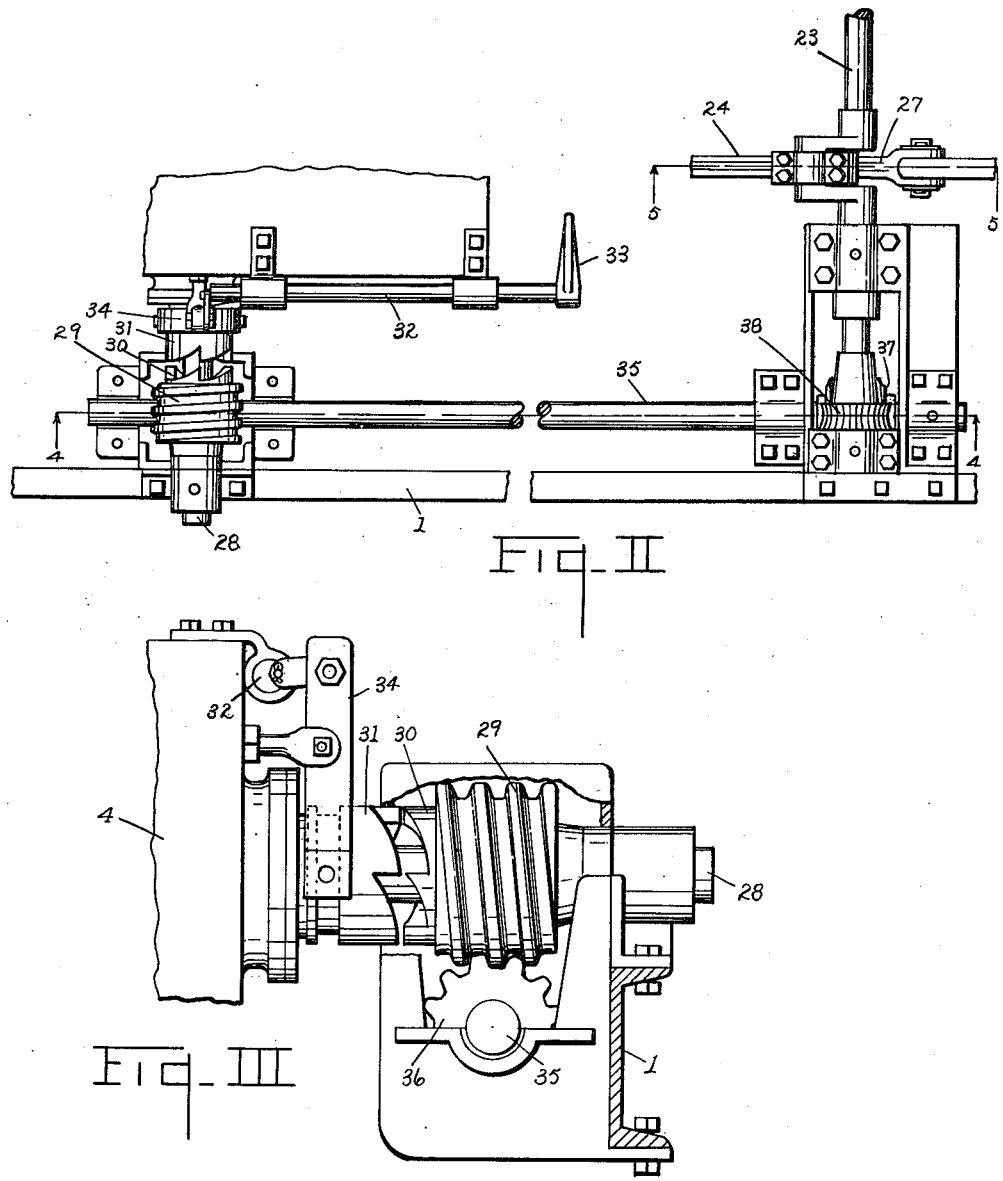

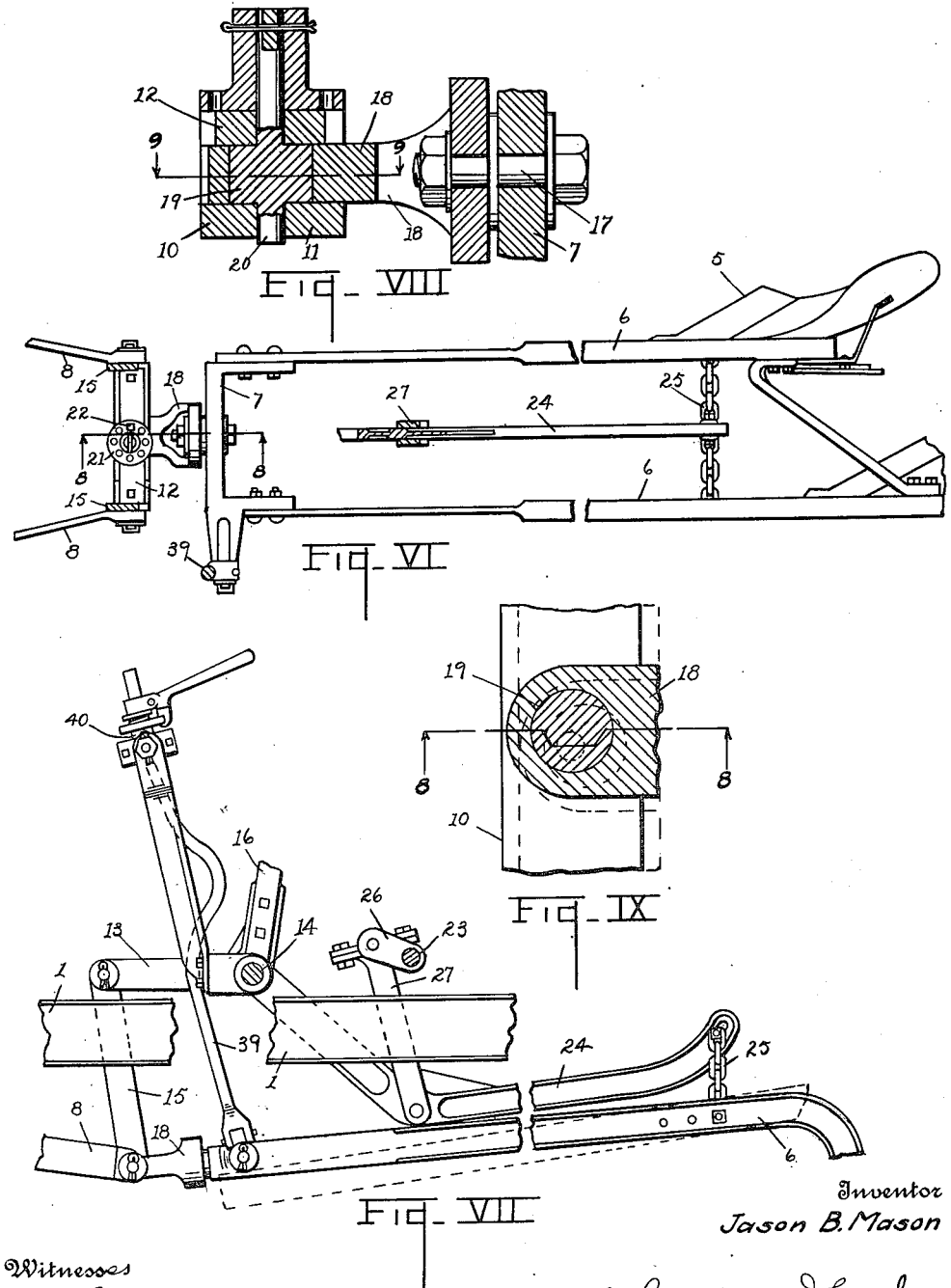

JASON B. MASON, OF KALAMAZOO, MICHIGAN, ASSIGNOR TO REED FOUNDRY & MACHINE CO., OF KALAMAZOO, MICHIGAN.

TRACTOR-PLOW.

1,298,989.  Specification of Letters Patent.  Patented Apr. 1, 1919.

Application filed November 14, 1918. Serial No. 262,541.

*To all whom it may concern:*

Be it known that I, JASON B. MASON, a citizen of the United States, residing at the city and county of Kalamazoo, State of Michigan, have invented certain new and useful Improvements in Tractor-Plows, of which the following is a specification.

This invention relates to improvements in tractor plows.

The main objects of this invention are:

First, to provide an improved tractor plow with power means for raising and lowering the plows.

Second, to provide an improved plow lift for tractor plows in which the raising and lowering is effected by the continuous rotation of a crank controlled by means of a clutch.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a side view of a structure embodying the features of my invention, parts being omitted and other parts being shown conventionally.

Fig. II is a detail plan view of my improved plow lift mechanism.

Fig. III is a detail view partially in section on a line corresponding to line 3—3 of Fig. I.

Fig. IV is an enlarged detail partially in section on a line corresponding to line 4—4 of Fig. II.

Fig. V is a detail view partially in section on a line corresponding to line 5—5 of Fig. II.

Fig. VI is a detail plan view of the plow draft connections on a line corresponding to the broken line 6—6 of Fig. IX.

Fig. VII is a detail side elevation showing further details of the lift mechanism.

Fig. VIII is a detail section on a line corresponding to line 8—8 of Figs. VI and IX.

Fig. IX is a detail section on a line corresponding to line 9—9 of Fig. VIII.

In the drawing similar reference characters refer to similar parts throughout the several views, and the sectional views are taken looking in the direction of the little arrows at the ends of the section lines.

Referring to the drawing, the frame 1 is preferably built up of channel iron but as its details form no part of this invention they are not further illustrated herein.

Traction wheels 2 are connected to the engine 3 through the transmission 4. These parts are shown conventionally.

The plows 5 are provided with beams 6 connected at their front ends by the cross bar or crosshead 7. The draw bars 8 are pivoted on hangers 9, the rear ends of the draw bars being connected by a cross member, designated generally by the numeral 10, the cross member being made up of spaced pieces 11 and 12. The rear ends of the draw bars are adjustably supported by the arms 13 on the rock shaft 14, the arms being connected to the draw bars by the links 15. The rock shaft is actuated by the lever 16. The means for securing the lever in its adjusted positions are not illustrated as suitable means are well-known.

The crosshead 7 of the plow beams is connected to the cross member of the draft bar by means of a swivel comprising a swivel bolt 17 arranged through the crosshead to engage the swivel member 18. The front end of the swivel member 18 is engaged with an eccentric block 19 carried by the pin 20 disposed through the cross member of the draw bar. This eccentric block is secured in its adjusted positions by the head 21 secured to the pin and having a series of holes therein adapted to receive the locking pin 22. By means of this eccentric the draft of the plows may be shifted or adjusted laterally within the limits of the eccentric.

To raise and lower the plows I provide a crank shaft 23 which is disposed transversely above the plow beams. Below this crank shaft is a lifting lever 24. The front of this lever is pivotally mounted on the shaft 14, while its rear end is connected to each of the plow beams by the chains 25, the lifting lever being disposed centrally relative to the plow beams.

The crank 26 of the crank shaft is connected to the lever by means of the link 27. The crank shaft is driven from the driving shaft 28 projecting from the housing of the transmission 4. On this shaft is a worm gear 29 provided with a clutch member 30 with which the sliding clutch member 31 coacts, the sliding clutch member being splined to the shaft. The clutch member 31 is shifted by means of the rock shaft 32 having a hand lever 33 at one end and a forked lever 34 at the other engaging the clutch member 31.

A driven shaft 35 is disposed longitudinally of the frame and provided with a worm gear 36 meshing with the worm 29. At its rear end the shaft 35 is provided with a worm 37 meshing with the gear 38 on the crank shaft 23.

By thus arranging the parts the plows are raised and lowered by driving the crank shaft continuously in one direction, and, owing to the worm driving connections, the plows are held in their adjusted position, either raised or lowered or partially raised or lowered, the entire control being through the clutch.

The adjustment of the plows is supplemented by an improved tilting means comprising the link 39 threaded at its upper end to receive an adjusting nut of the adjusting means, designated generally by the numeral 40. This tilting means is the subject matter of a co-pending application and I do not, therefore, describe the same in detail herein.

My improved plow lifting mechanism is very desirable in that it is simple and easy to operate and may be nicely adjusted or operated as working conditions may require. I have illustrated and described my improvements in an embodiment which I have found to be very practical. I have not attempted to illustrate or describe certain modifications or adaptations in structural details, as I believe the disclosure made will enable those skilled in the art to which my invention relates to embody or adapt the same as may be desired.

Having thus described my invention, what I claim as new and desire to secure by Letters Patent, is:

1. The combination with a frame, of a draw bar pivotally mounted thereon, means for adjustably supporting the rear end of said draw bar, a plow provided with a beam pivotally connected to said draw bar, a crank shaft on said frame disposed above said beam, a lifting lever pivotally mounted at its forward end to the frame and connected at its rear end to said beam, and a link connecting said lever to the crank of said shaft.

2. The combination with a frame, of a draw bar pivotally mounted thereon, means for adjustably supporting the rear end of said draw bar, a plow provided with a beam pivotally connected to said draw bar, a crank shaft on said frame disposed above said beam, a lifting lever pivotally mounted at its froward end to the frame and connected at its rear end to said beam, a link connecting said lever to the crank of said crank shaft, and driving connections for said crank shaft comprising a worm whereby said crank shaft is held in its adjusted positions.

3. The combination with a frame, of a plow mounted for adjustment, a crank shaft on said frame disposed above said plow, a lifting lever connected to said plow, a link connecting said lever to the crank of said crank shaft, and driving means for said crank shaft comprising a worm and clutch whereby said crank shaft may be continuously driven in one direction and is held in its adjusted positions.

In witness whereof I have hereunto set my hand and seal in the presence of two witnesses.

JASON B. MASON. [L. S.]

Witnesses:
J. E. WELBORN,
H. M. WELBORN.